United States Patent [19]

Pennell

[11] 3,991,445
[45] Nov. 16, 1976

[54] LOCKING CABLE FOR SECURING PORTABLE OBJECTS SUCH AS BICYCLES

[75] Inventor: Phillip E. Pennell, Lakewood, Colo.

[73] Assignee: The Gates Rubber Company, Denver, Colo.

[22] Filed: June 18, 1973

[21] Appl. No.: 371,313

[52] U.S. Cl. .............................. 24/73 A; 24/122.3; 70/18; 403/212; 403/275; 74/501 P
[51] Int. Cl.² .................. F16G 11/02; E05B 73/00
[58] Field of Search ............. 24/122.3, 122.6, 73 A; 70/18; 403/212, 275; 174/79; 339/100, 97 R, 97 C; 294/74; 285/256; 74/501 P

[56] References Cited
UNITED STATES PATENTS

| 231,751 | 8/1880 | Bailey | 403/275 |
|---|---|---|---|
| 1,862,505 | 6/1932 | Chadbourne | 403/275 |
| 2,040,992 | 5/1936 | Harris | 403/275 |
| 2,598,921 | 6/1952 | Knudsen | 294/74 |
| 2,712,953 | 7/1955 | Snow | 403/275 |
| 2,719,278 | 9/1955 | Kernen | 24/122.3 |
| 2,733,941 | 2/1956 | Trevaskis | 285/256 |
| 2,829,671 | 4/1958 | Ernst | 285/256 |
| 2,865,978 | 12/1958 | Modrey | 285/256 |
| 3,170,206 | 2/1965 | Triplett | 24/73 A |
| 3,258,031 | 6/1966 | French | 74/501 P |
| 3,317,233 | 5/1967 | Black | 294/74 |
| 3,434,501 | 3/1969 | Conrad | 74/501 P |
| 3,522,961 | 8/1970 | Cave | 24/122.6 |
| 3,539,207 | 11/1970 | Harris | 285/256 |
| 3,549,180 | 12/1970 | MacWilliam | 285/256 |
| 3,554,050 | 1/1971 | Conrad | 74/501 P |
| 3,581,523 | 6/1971 | Bartholomew | 74/501 P |
| 3,756,008 | 9/1973 | Smith | 70/18 |

FOREIGN PATENTS OR APPLICATIONS

| 1,256,011 | 12/1967 | Germany | 285/256 |

*Primary Examiner*—Bernard A. Gelak
*Attorney, Agent, or Firm*—Curtis H. Castleman, Jr.; Raymond Fink; H. W. Oberg, Jr.

[57] ABSTRACT

A flexible cable is described for coupling portable objects such as bicycles to a support which cable includes a metal reinforcement member interposed and sandwiched between an inner body of heat setting polymeric material and a cover of heat setting resilient polymeric material which intimately engages the reinforcement member. The ends of the cable are provided with means for receiving a detachable locking means.

8 Claims, 3 Drawing Figures

LOCKING CABLE FOR SECURING PORTABLE OBJECTS SUCH AS BICYCLES

BACKGROUND OF THE INVENTION

This invention relates to locking cables for bicycles and other portable objects and in particular relates to a flexible locking cable made of a metal reinforcement completely disposed between contiguous ploymeric or elastomeric layers.

With a resurgence in the use of bicycles, motorcycles and similar articles, there has been a concomitant increase in thefts of these articles. A number of different types of locking mechanisms have been utilized in an attempt to discourage such thefts. The most popular locking mechanism consists of a length of chain which is drawn through the spokes of a wheel and around the frame, for instance, and then the ends of the chain entrained around a stationary object (e.g. a bicycle rack) and coupled together with a padlock. The sophisticated thief has no problem rapidly breaking chains of moderate size with the aid of bolt cutters or a hacksaw, even when the individual links are made of hardened steel. Alternatively, by taking advantage of the brittle character of the chain at low temperatures, thieves have been known to apply freon to one of the chain links causing it to become very brittle and permitting the thief to easily shatter the link by imposition of a shock load; this method is successfully applied to fairly heavy duty chains.

While many of these chain-type locks employ a plastic sleeve loosely fitted over the chain to prevent scratching of the bike parts, such plastic sheet or sleeve does not prevent the thief with the aid of freon from embrittling the end most links of the chain coupled with the padlock, combination lock or other locking device and which are outside the plastic sleeve and fully exposed.

Among the objects of the invention are the provision of a locking cable which does not suffer from the drawbacks characteristic of chain-type locks; provision of a flexible metal reinforced polymeric body which is more difficult and takes much more time to sever with bolt cutters, hacksaws, or other customarily used devices; and the provision of a locking cable which is easily and inexpensively manufactured by known techniques and in certain embodiments utilizes heretofor discarded materials.

Briefly described, a flexible locking cable is described comprising a metal reinforcement interposed and sandwiched between an inner elongated flexible heat setting polymeric body and an outer cover composed of a heat setting resilient polymeric material, the reinforcement and outer cover being in intimate engaging contact with one another. The thus formed metal reinforced polymeric cable also has at the ends of such cable means, e.g. integral loops, for receiving a detachable locking device.

The invention also contemplates in one aspect thereof a method for producing a flexible locking cable by using as the inner body thereof a flexible mandrel customarily used in the making of tubular articles such as hose, which mandrel is normally discarded in the making of the hose after a limited period of use. In another embodiment scrap metal-reinforced hose lengths are utilizable as the cable body.

BRIEF DESCRIPTION OF THE DRAWINGS

Preferred aspects of the invention as presently contemplated will be described in reference to the accompanying drawings, in which.

PREFERRED EMBODIMENTS OF THE INVENTION

Figure 2:
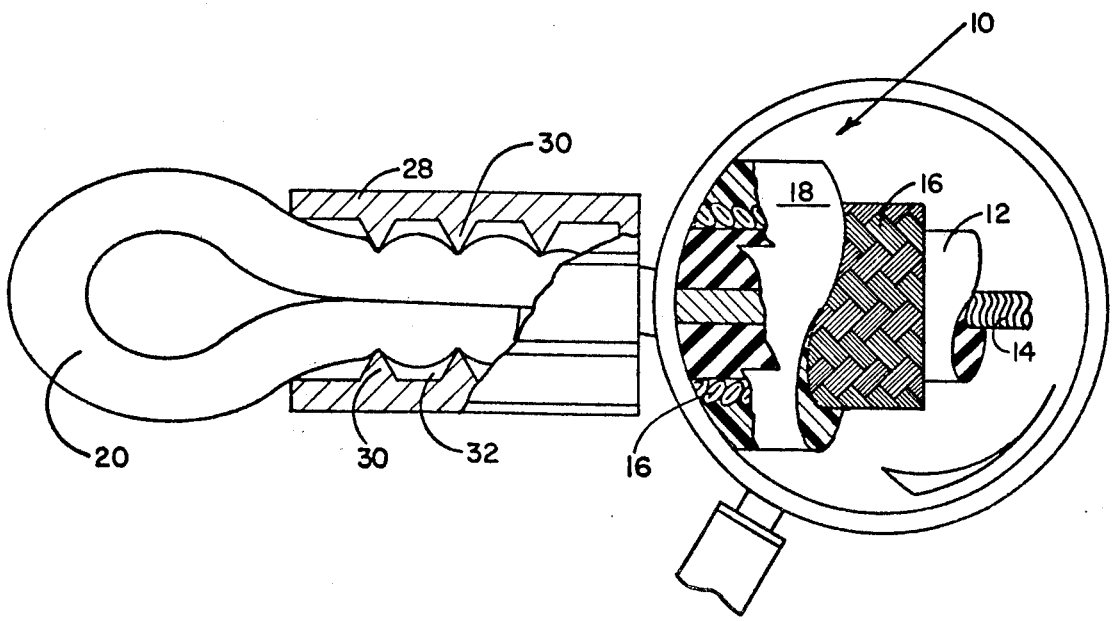
FIG. 2 depicts an end portion of the cable of FIG. 1 in partial section and in partial cutaway and partly magnified.

Referring to FIG. 2, the cable 10 of the invention in one embodiment is formed of an inner elongated flexible rod-like body 12 made of a heat setting polymeric material, in which is axially disposed cable member 14. The inner polymeric body 12 together with the embedded cable 14 may be provided as an integral member by reclaim of flexible mandrel normally used to facilitate production of tubular articles such as hose. The cable is in general longitudinally and preferably axially disposed within the polymeric rod, the cable preferably being composed of a high modulus material such as a plurality of wound steel strands. The mandrel may be formed by extruding the heat setting polymeric material about the cable to form a covering thereover as is well known.

The metal reinforcement, which may be in the form of braided strands of wire 16, or alternatively a wrapped or spiraled reinforcement, or the like, is applied to the flexible rod 12 whereby the metal reinforcement is securely attached to the rod. One or more piles of the reinforcement may be utilized. A cover 18 also made of a heat setting polymeric material is applied to the outer surface of the metal reinforced rod such as by an extrusion or molding operation. Examples of heat setting polymeric materials which are useful for the outer cover as well as the inner flexible body include elastomerics such as natural and synthetic rubbers or mixtures thereof, and extrudable thermoplastics including polyvinylchloride, polypropylene, polyester, polyethylene, polyurethane, and the like.

The metal reinforcement is interposed and sandwiched between the inner rod 12 and the outer cover 18, and by virtue of the extrusion or molding operation, the metal reinforcement is in intimate engaging contact througout the outer surface of the reinforcement with the outer cover member. During the extrusion or molding step, the polymeric material moves into the interstitial grooves or spaces between the individual strands of the wire braid to form a mechanical bond between the reinforcement and polymeric cover by adhesion. While this mechanical bond is normally sufficient, it may be desirable to treat the reinforcement, such as by alloying it with copper, or utilizing brass wire, to thereby form a cohesive bond with the polymeric cover. The polymeric material may also be compounded with a material which improves adhesion with the metal reinforcement.

In one preferred form of the invention the inner body is formed of the flexible mandrel which is made of a pre-cured elastomeric material, such as EPDM. Brass wire braid is applied to the mandrel and the thus reinforced rod is delivered through a tubing machine in which a thermoplastic material has been raised to its plastic state and is extruded as a cover onto the metal reinforcement. No further heat setting or curing is required. In one preferred form, a polymeric foam is used. However, when it is desired to sheathe the metal rod with a rubber or other elastomeric cover, the partially green cable may be subjected to an open steam cure or sheathed with lead and heated to the set or cure temperature of the rubber as is well known in the production of rubber tubular articles. In this latter embodiment, the metal reinforcement will e throughly embedded in elastomeric material, and a firm mechanical and chemical cohesive bond will be formed therebetween. As previously mentioned, this bond may be improved by utilizing copper coated wire, brass wire, or adhesive to enhance cohesion between the reinforcement and either or both of the inner body and outer cover.

Figure 1:
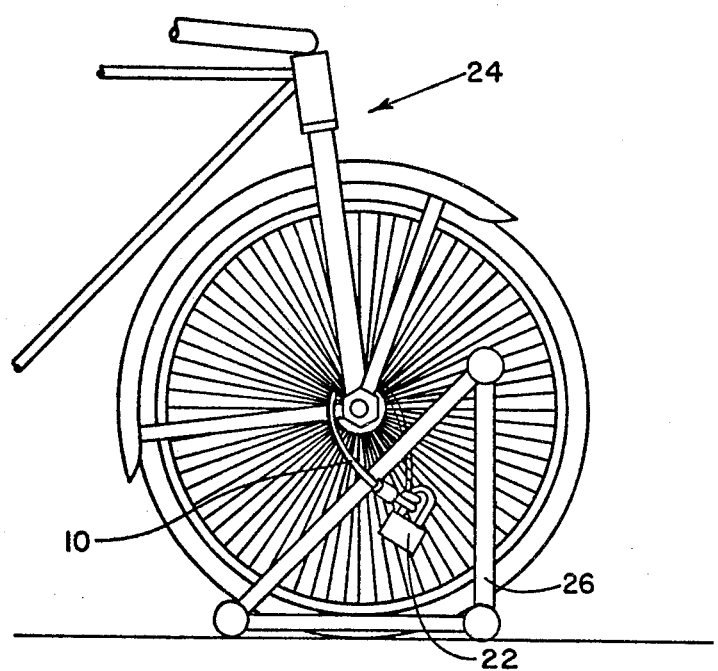
FIG. 1 shows a locking cable of the subject invention in operative locking association with a portion of a bicycle.

To couple the ends of the cable of FIG. 2, first a loop 20 is formed in each of the respected ends. When the loops are superimposed on one another, a locking device such as a padlock 22 as shown in FIG. 1 may be utilized to couple the loops, in this illustration securing a bicycle 24 to a support 26 by serpentining the cable 10 through spokes and around the axle of the bicycle.

While the metal braid reinforcement is quite strong, the inherent nature of the braided configuration is to permit considerable flexibility and particularly allows the end to be looped as shown in FIG. 2. The loop is held in place by ferrule 28 having internal radially inwardly upstanding ribs 30, and which have been displaced inwardly from a normal position by crimping, for instance. The crimping operation causes the polymeric material to enter the troughs 32 between the upstanding ribs 30 and prevent dislodgement of the looped cable from the ferrule. A radial reduction crimp may be employed, or the ferrule may be flattened by a non-circular die shape Referring to the alternative embodiment depicted in FIG. 3, the locking cable 40 is comprised of an inner flexible tube 34 made of a heat setting polymeric material, as previously defined, an outer cover 36 made of heat setting resilient polymeric material disposed exteriorly of the inner tube, and a sandwiched metal reinforcement 38. In one preferred embodiment, the cable is made by extruding an elastomeric tube 34 on which is applied wire braid reinforcement 38. Onto the thus formed wire reinforced tube is extruded an outer cover 36 of elastomeric material, such as neoprene stock. The uncured hollow cable, which resembles hydraulic hose (and in fact can be a length of such hose), is then subjected to curing such as by an open steam treatment or by utilizing a conventional lead sheathing operation whereby the cable is vulcanized and the lead stripped off. Alternatively, as is also the case with the embodiment of FIG. 2, either or both of the inner flexible tube and outer tubular cover may be formed of an extrudable thermoplastic, in lieu of utilizing an elastomer.

Figure 3:
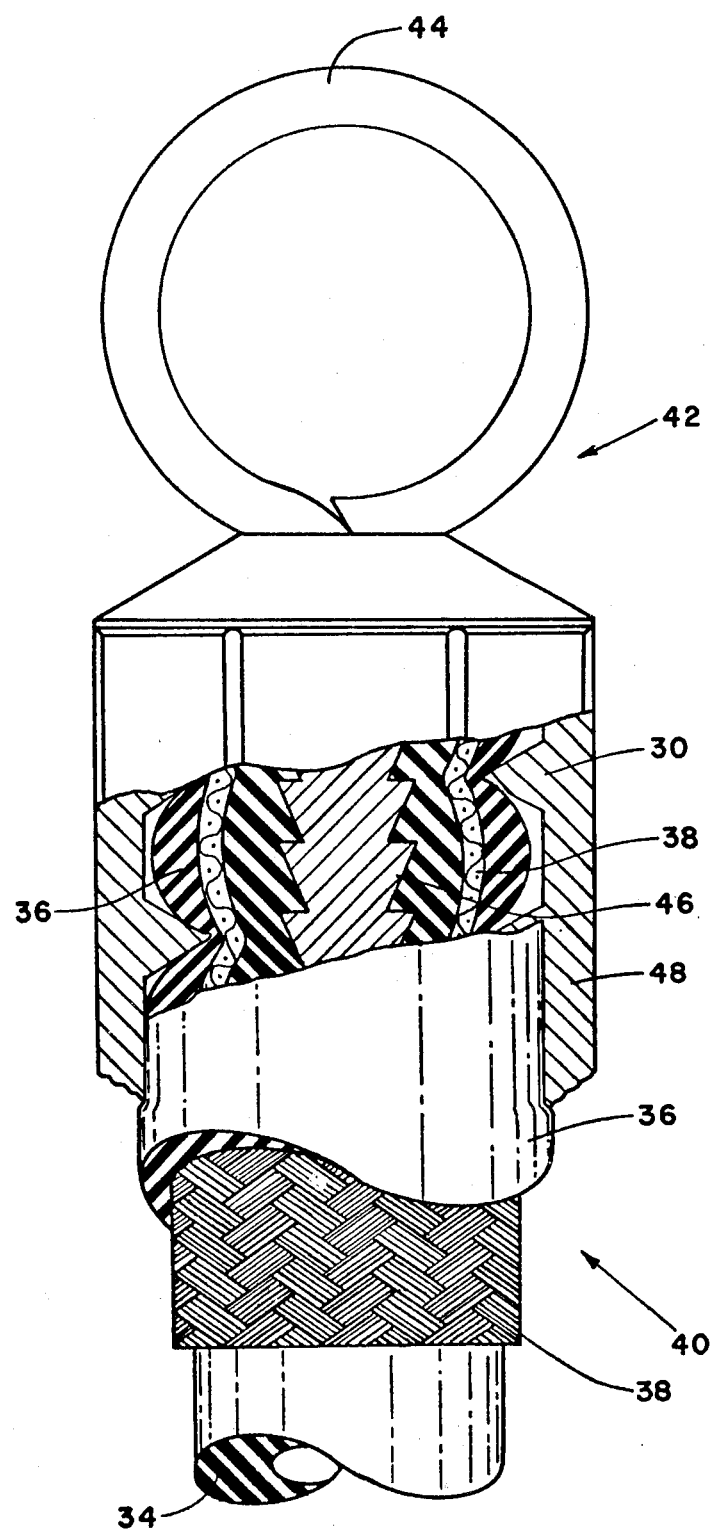
FIG. 3 shows a view similar to FIG. 2 illustrating an alternative embodiment.

The end of the cable may be looped and secured by a ferrule connector similar to the embodiment of FIG. 2. Alternatively, as shown in FIG. 3 the tubular cable has an end coupling 42 consisting of a ferrule 48 and eye end 44 with a corrugated shank 46. The corrugations of the shank are engageable with the contiguous resilient rubber inner body 34. To assemble the connector, the ferrule, which normally has a greater diameter than the cable, is placed over the outer surface of the cable, and the shank of the eye is inserted in the axial opening of the inner body. By the use of a suitable tool, such as a crimper fixture, the ferrule is radially inwardly displaced whereby the cable is held firmly in place. Alternatively, due to the high shear resistance of the elastomeric inner body, the corrugations on the shank 46 may be dispensed with. A padlock or other locking device engages the respective eye ends of the cable. If a combination lock is employed, the eye and shank are replaced and the coupling modified to accept a plug-in or other type of combination lock.

A ¼ inch internal diameter hydraulic hose corresponding to the embodiment of FIG. 3, and utilizing the looped ends of FIG. 2, has been found to offer a number of advantages as compared to conventional hardened chain locking devices. The cable of the subject invention is lighter and more easily handled than a chain and the integral polymeric cover prevents scratching. And as previously mentioned, the polymeric cover of the cable shields the metal reinforcement so that it cannot be embrittled (such as by the use of freon).

The locking cable of the subject invention has the important advantages that it is very difficult to cut in a reasonably short time with a hacksaw, bolt cutters or other tool. The primary reason for such resistance to cutting is believed to be a result of the metal reinforcement being sandwiched or embedded within adjacent and contiguous layers of polymeric material. The resilience of the outer cover provides considerable "give" rendering it difficult to get a decent grip on the metal reinforcement. The adjacent polymeric layers resiliently support the reinforcement, and the reinforcement is particularly well shielded when it is fully embedded within adjacent polymeric bodies. Also, due to the fairly small diameter of the cable (generally less than about 3 inches) most bolt cutters will sever the reinforcement only with difficulty inasmuch the customary construction of the teeth of the cutters, particularly after they become worn from use, is such that they never fully close. When such cutters are applied to the cable of the subject invention, the polymeric material gives and deforms sufficiently that the bolt cutters have "bottomed out" and are unable to grasp the metal reinforcement sufficiently to sever it. The amount of give is accentuated when the cable is hollow as in FIG. 3.

An additional advantage to using the hydraulic hose embodiment of FIG. 3 is that scrap lengths customarily discarded during the manufacture of such hose may be used, thus converting normally scrapped material into a useful article of manufacture at a minimum cost.

The embodiment of FIG. 2 has the distinct advantage of utilizing flexible rod mandrels normally discarded in the manufacture of rubber tubing materials, such as hose. Such mandrels normally are used because they insure the dimensional stability of the inside diameter of the tube of the hose during vulcanizing. However, when the lengths of the mandrels become less than a certain amount, e.g. 100 feet, they are generally discarded. Last year, over 2.5 million feet of this flexible mandrel material of the ¼ inch diameter size was discarded by Applicant's assignee alone. The subject invention prevents this extreme waste and converts the material into a very useful commodity. The mandrels are cut to size, then formed into a locking cable as disclosed with reference to FIG. 2.

It should be understood that the invention is capable of a variety of modifications and variations which will be made apparent to those skilled in the art by a reading of the specification and which are to be included within the spirit of the claims appended hereto. For instance, while the invention has been illustrated using cylindrical or tubular cable having a metal reinforcement member whose cross-section is essentially circular, alternatively the reinforcement could be substantially flat in cross-section and sandwiched between upper and lower polymeric layers to form a composite integral laminate. Additionally, although a single layer of polymeric material has been shown on either side of the reinforcement, clearly additional polymeric layers with or without additional plies of reinforcement would be useful.

What is claimed is:

1. A flexible locking cable comprising in combination:
   an inner hollow elongated flexible body made of a heat setting polymeric material;
   an outer cover made of a heat setting resilient polymeric material disposed exteriorly of the inner body;
   metal reinforcement interposed and sandwiched between the inner body and outer cover, said reinforcement having an outer surface which is in intimate engaging contact with the outer cover and said inner body having flowed into intimate contact with the metal reinforcement;
   loop means secured to the ends of the cable for receiving detachable locking means to join the ends of the cable together to form an endless loop; and
   coupling means joining said cable to said loop means including a corrugated shank of substantially uniform outer diameter axially disposed within the ends of the inner body, and ferrule means disposed concentrically of said shank and contracted against the outer cover to tightly secure the cable from longitudinal displacement, said shank being integral with said loop means.

2. The cable of claim 1 wherein the inner body and outer cover form a unitary bonded structure within which is embedded the metal reinforcement.

3. The cable of claim 1 wherein the outer cover is made of an extrudable material which forms a bond with the metal reinforcement.

4. The locking cable of claim 1 wherein the metal reinforcement consists of braided wire strands.

5. The locking cable of claim 1 wherein the inner flexible body and the outer cover are formed of curable elastomeric material which form a unitary bonded structure within which is embedded the metal reinforcement which is bonded directly to each of the inner body and outer cover.

6. The cable of claim 1 wherein said ferrule means has internal radially inwardly upstanding members which intimately engage the outer cover of resilient material.

7. A flexible locking cable comprising in combination:
   an inner elongated hollow flexible body made of a heat setting polymeric material;
   an outer cover made of a heat setting resilient polymeric material disposed exteriorly of the inner body;
   flexible filamentary metal reinforcement having interstitial grooves or spaces defined between the filaments, said reinforcement being interposed and sandwiched tightly between the inner body and outer cover, said reinforcement having an outer surface throughout which is in intimate engaging contact with the outer cover, and said interstitial grooves or spaces being substantially filled with the polymeric material of the outer cover; and
   loop means carried by the ends of the cable for receiving detachable locking means to join the ends of the cable together to form an endless loop;
   coupling means joining said cable to said loop means including a corrugated shank of substantially uniform outer diameter axially disposed within the ends of the inner body, and ferrule means disposed concentrically of said shank and contracted against the outer cover to tightly secure the cable from longitudinal displacement, said shank being integral with said loop means.

8. The cable of claim 7 wherein said ferrule means has internal radially inwardly upstanding members which intimately engage the outer cover of resilient material.

* * * * *